United States Patent
Fuchs et al.

(10) Patent No.: US 11,196,322 B2
(45) Date of Patent: Dec. 7, 2021

(54) METHOD FOR PRODUCING AN ELECTRIC MOTOR AND ELECTRIC MOTOR

(71) Applicants: Martin Fuchs, Untereisesheim (DE); Johannes Daniel Knöppel, Bad Emstal (DE); Nils Wilhelm, Edertal (DE); Alex Wist, Baunatal (DE); David Müller, Hardegsen (DE)

(72) Inventors: Martin Fuchs, Untereisesheim (DE); Johannes Daniel Knöppel, Bad Emstal (DE); Nils Wilhelm, Edertal (DE); Alex Wist, Baunatal (DE); David Müller, Hardegsen (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 403 days.

(21) Appl. No.: 16/321,627

(22) PCT Filed: Jun. 20, 2017

(86) PCT No.: PCT/EP2017/064987
§ 371 (c)(1),
(2) Date: Jan. 29, 2019

(87) PCT Pub. No.: WO2018/019474
PCT Pub. Date: Feb. 1, 2018

(65) Prior Publication Data
US 2021/0203212 A1    Jul. 1, 2021

(30) Foreign Application Priority Data
Jul. 29, 2016  (DE) .................... 10 2016 214 032.9

(51) Int. Cl.
*H02K 3/50*       (2006.01)
*H02K 11/25*      (2016.01)

(52) U.S. Cl.
CPC ............... *H02K 11/25* (2016.01); *H02K 3/50* (2013.01)

(58) Field of Classification Search
CPC .................................. H02K 3/50; H02K 11/25
(Continued)

(56) References Cited

U.S. PATENT DOCUMENTS 2,471,840 A * 5/1949 Seely ..................... H02K 11/25
                                                        318/473
3,130,479 A    4/1964 Pleiss
(Continued)

FOREIGN PATENT DOCUMENTS

DE        198 59 011 C1    9/2000
DE        697 26 112 T2    4/2004
(Continued)

OTHER PUBLICATIONS

Hesse, Machine Translation of DE102012011004, Dec. 2013 (Year: 2013).*
(Continued)

*Primary Examiner* — Quyen P Leung
*Assistant Examiner* — Eric Johnson
(74) *Attorney, Agent, or Firm* — Pearl Cohen Zedek Latzer Baratz LLP

(57) ABSTRACT

In a method for manufacturing an electric motor comprising a rotor and a stator a placeholder for a temperature sensor is inserted in the axial direction between a first coil layer and an adjacent second coil layer of a winding head such that the placeholder is situated in a gap-shaped recess extending between the first and the second coil layers, the first coil layer is then pressed onto a circumferential surface of the placeholder and onto the second coil layer and is plastically deformed such that a space between the lateral surfaces of the two coil layers and the circumferential surface of the (Continued)

placeholder is reduced, and a contact surface between the lateral surface of the first coil layer and the circumferential surface of the placeholder is enlarged. By removing the placeholder, a receiving chamber is subsequently formed in the winding head, into which a temperature sensor is then inserted.

10 Claims, 9 Drawing Sheets

(58) Field of Classification Search
USPC .................................................. 310/68 C
See application file for complete search history.

(56) References Cited

U.S. PATENT DOCUMENTS

| | | | |
|---|---|---|---|
| 5,343,613 | A | 9/1994 | Kintz et al. |
| 6,153,954 | A | 11/2000 | Uchida et al. |
| 2009/0260219 | A1* | 10/2009 | Takada ............... H02K 15/0478 29/596 |
| 2013/0214634 | A1* | 8/2013 | Hasegawa .......... H02K 15/0435 310/194 |
| 2019/0044406 | A1* | 2/2019 | Yamamoto ............. H02K 7/083 |

FOREIGN PATENT DOCUMENTS

| | | | |
|---|---|---|---|
| DE | 10 2011 088 527 A1 | 6/2013 | |
| DE | 10 2012 104 210 A1 | 6/2013 | |
| DE | 10 2012 011 004 A1 | 12/2013 | |
| DE | 102013201835 A1 * | 8/2014 | ............. H02K 11/25 |
| DE | 10 2015 006 345 A1 | 11/2015 | |
| DE | 10 2015 203 435 A1 | 9/2016 | |
| JP | 06070510 A * | 3/1994 | |

OTHER PUBLICATIONS

Bruckner, Machine Translation of DE102013201835, Aug. 2014 (Year: 2014).*
Sunaga, Machine Translation of JP06070510, Mar. 1994 (Year: 1994).*
International Search Report of PCT Patent Application No. PCT/EP2017/064987, dated Oct. 25, 2017.
Search Report of German Patent Application No. 10 2016 214 032.9, dated May 31, 2017.

* cited by examiner

METHOD FOR PRODUCING AN ELECTRIC MOTOR AND ELECTRIC MOTOR

CROSS-REFERENCE TO RELATED APPLICATIONS

This application is a National Phase Application of PCT International Application No. PCT/EP2017/064987, International Filing Date Jun. 20, 2017, claiming priority of German Patent Application No. 10 2016 214 032.9, filed Jul. 29, 2016, which is hereby incorporated by reference.

Field of the Invention

The invention relates to a method for manufacturing an electric motor, in particular an electric motor that is usable as a drive machine of a motor vehicle, with a distributed winding having a winding head and designed as a wave winding, and with a temperature sensor for detecting the temperature of the winding or the winding head. The invention further relates to an electric motor of this type.

BACKGROUND OF THE INVENTION

It is generally known that electric motors must be protected from overheating, in particular to avoid damage to the windings and/or an adverse impact on the magnets. This is typically carried out by directly or indirectly monitoring the temperature of an electric motor at one or more locations, and above a predefined temperature, taking measures to counteract a further increase in temperature. In most cases this takes place by control or regulation with the aid of the power electronics system.

The winding head is generally the hottest location, and therefore is the preferred measuring point for the temperature sensor. DE 10 2012 011 004 A1 describes an electric motor having a stator, in which a receiving chamber for a temperature sensor is provided in the area of one of the winding heads of a winding, the receiving chamber being created by temporary placement of a placeholder in the winding and subsequent impregnation with an impregnation material. The receiving chamber for the temperature sensor is thus designed as a hollow body in the impregnation material of the winding head.

An electric motor having a temperature sensor for detecting a temperature of a winding is known from both DE 10 2012 104 210 A1 and DE 10 2011 088 527 A1. This involves an air-cooled electric motor, having a two-pole stator, for household appliances and power tools.

To increase the power of electric machines, the windings are built up with increasing thickness, as the result of which the installation space for arranging a temperature sensor for detecting the temperature becomes increasingly smaller. When round coils are used, in the winding head the installation space for the temperature sensor results from the distance that is present between two adjacent round coils, which is dictated by the design. However, electric motors having distributed windings or wave windings have become increasingly prevalent in recent times. The winding is made up of multiple circumferential ring-shaped coil layers arranged one above the other in a layered manner. Due to this design, the winding head of a wave winding is very rigid, depending on the geometry of the copper wires. As a result, the temperature sensor is not easily insertable between the coil layers of the winding.

For this reason, the temperature measurement at such winding heads has thus far been carried out using a temperature sensor situated radially or axially on the winding head, so that the temperature sensor rests against the winding head surface only at certain points. As result, the temperature measurement provides values that are lower than the temperatures actually prevailing in the interior of the winding head. In addition, a large time lag in measured changes in temperature is observed. However, the most accurate knowledge possible is a prerequisite for providing maximum performance of the electric machine.

SUMMARY OF THE INVENTION

In light of this background, the object of the invention is to implement a method for manufacturing an electric motor, as well as an electric motor, in such a way that the temperature measurement in a distributed winding of a stator designed in particular as a wave winding is significantly improved, and in particular undesirable error influences in the temperature measurement are thus avoided.

The first stated object is achieved with a method according to the features of the independent claims. Dependent claims relate to particularly advantageous refinements of the method according to the invention.

According to the invention, a method is thus provided for manufacturing an electric motor comprising a rotor and a stator, the stator thereof having a hollow cylindrical stator metal sheet and a distributed winding made up of multiple circumferential coil layers arranged one above the other in a layered manner, wherein a placeholder for a temperature sensor for detecting a temperature of the winding is inserted in the axial direction between a first coil layer and an adjacent second coil layer of a winding head of the winding in such a way that the placeholder is situated in a gap-shaped recess extending between the first coil layer and the second coil layer, wherein the first coil layer is then pressed onto a circumferential surface of the placeholder and onto the second coil layer, i.e., in the direction of the second coil layer, and is plastically deformed in such a way that a space, previously present between the lateral surfaces of the two coil layers and the circumferential surface of the placeholder, is reduced, and a contact surface between the lateral surface of the first coil layer and the circumferential surface of the placeholder is enlarged, wherein subsequent removal of the placeholder forms a receiving chamber in the winding head, into which a temperature sensor is then inserted. The method according to the invention ensures that the coil layers circumferentially enclose the temperature sensor situated in the receiving chamber, resulting in virtually full-surface contact between an outer lateral surface of the temperature sensor and the two coil layers. Due to the flat contact between the temperature sensor and the coil layers, a temperature measurement in a winding head of a wave winding is provided that is significantly improved compared to a temperature measurement with punctiform contact of the temperature sensor. In particular, undesirable error influences and measured value deviations may be avoided. As a result of the receiving chamber, and thus also the temperature sensor inserted therein, extending in the axial direction between the two coil layers up to the interior of the winding head, measurement takes place not at the surface of the winding head, as in the prior art stated at the outset, but, instead, at the hottest location inside the winding head, so that the electric motor may be operated at maximum performance.

The introduction of the placeholder between the two coil layers and the plastic deformation of the coil layer are facilitated or enabled in particular by introducing the placeholder between a radially outer or a radially inner first coil layer and an adjacent second coil layer. It has proven particularly advantageous when the first coil layer is the radially inner layer, which is the last to be situated in the grooves of the stator metal sheet, and the second coil layer is an adjacent coil layer that encloses the first coil layer. However, it would also be conceivable for the first coil layer to be the radially outer coil layer, which is the first to be situated in the grooves of the stator metal sheet, and for the second coil layer to be an adjacent coil layer that is enclosed by the first coil layer.

In addition, it is provided that the pressing of the first coil layer against the placeholder and the second coil layer takes place using a forming die that acts on the first coil layer in the radial direction. The force necessary for plastically deforming the first coil layer may thus be provided reproducibly and with high process reliability.

In this case, it has proven advantageous to use a forming die having a concave recess that extends in the axial direction, a section of the first coil layer resting against the placeholder being formed by the concave recess of the forming die. This ensures that the first coil layer in the area around the placeholder is plastically deformed in such a way that the coil layer and the temperature sensor rest essentially flatly against one another, and at the same time the space between the two coil layers in an area adjacent to the placeholder is reduced to a minimum.

According to the invention, it is further provided that the gap-shaped recess between the two coil layers is created by axially inserting a mandrel-like tool. Due to the rigidity of the coil layers made up of copper wire, the insertion of the tool mandrel results in bending of the coil layers. The limited bending radius of the copper mats results not in formation of a nonideal opening that is matched to the cross section of the temperature sensor, but, rather, an elongated gap between the two coil layers. By use of the tool mandrel, the forces necessary for bending the coil layers can be introduced into the coil layers in a reproducible manner and with high process reliability.

In a departure herefrom, it is also possible, depending on the wire geometry of the two coil layers, to create the gap-shaped recess between the two coil layers by axially inserting the placeholder between the two coil layers. It is particularly advantageous that the placeholder remains in the created gap-shaped recess after the coil layers are bent, and subsequently forms the counterholder or the support during the plastic deformation or shaping of the first coil layer.

One advantageous variant of the present method is also provided by impregnating the winding head with an impregnation material, in particular an impregnation resin, in an impregnation bath prior to removal of the placeholder. In this way, during the shaping of the coil layers, the placeholder situated in the gap-shaped recess also ensures that the receiving chamber for the temperature sensor is formed after the winding head is impregnated and the placeholder is subsequently withdrawn or removed. The receiving chamber is free of impregnation material, and is delimited by the coil layers and the cured impregnation material.

In contrast, another variant of the method according to the invention that differs herefrom provides that the placeholder is removed prior to the impregnation, and the receiving chamber for the temperature sensor is closed by off by another, second placeholder which is removed from the receiving chamber after the impregnation. In this way, the properties of the two placeholders may be adjusted to their particular tasks. The first placeholder, due to the forces that act on it for deformation of the first coil layer, requires a certain rigidity or hardness, and therefore is made of a suitable hard plastic or metal. The focus for the second placeholder is instead ease of demolding, so that it is made of polytetrafluoroethylene (PTFE) or at least has a PTFE coating.

One advantageous refinement of the method is also provided by inserting the stator into a housing part after the impregnation and the removal of the particular placeholder from the receiving chamber, and subsequently inserting the temperature sensor into the receiving chamber in the winding head through an opening in the housing part. In this way, after the electric motor is completed, the temperature sensor may be inserted from the outside into the receiving chamber in the winding head of the stator. This embodiment allows particularly simple installation and deinstallation of the temperature sensor, so that the temperature sensor may also be removed for repair or inspection purposes, or for replacement with an operational temperature sensor.

It is also provided that before the stator is inserted into the housing part, an insulating washer with an insertion funnel is situated on the stator metal sheet in such a way that after insertion, the insertion funnel is situated coaxially with respect to the opening in the housing part and coaxially with respect to the receiving chamber in the winding head of the stator, and during insertion into the opening in the housing part, the temperature sensor is guided by the insertion funnel into the receiving chamber in the winding head. This greatly simplifies insertion of the temperature sensor into the receiving chamber in the winding head, shortens the installation time, and ensures arrangement of the temperature sensor in the receiving chamber in the winding head with high process reliability.

The second stated object is achieved with an electric motor according to the features of the independent claims. Dependent claims relate in particular to an advantageous refinement of the electric motor.

According to the invention, an electric motor comprising a rotor and a stator is thus provided, the stator thereof having a stator metal sheet, and a distributed winding made up of multiple circumferential ring-shaped coil layers arranged one above the other in a layered manner and having a winding head, wherein a temperature sensor for detecting a temperature of the winding is inserted through an opening in a housing part that encloses the stator, at least in sections, and into a receiving chamber that is situated in the winding head and arranged between two coil layers. This allows significantly improved temperature measurement in a winding head of a wave winding, as the result of which in particular undesirable error influences and measured value deviations are avoided. In addition, the installation and deinstallation of the temperature sensor are greatly simplified, since it may be inserted from the outside into the receiving chamber in the winding head and removed therefrom. Another advantage is the replaceability of the temperature sensor, so that, in particular in the event of a malfunction or defect, it may be replaced as necessary with an operational temperature sensor.

One advantageous embodiment of the electric motor provides that an insulating washer having an insertion funnel that is situated coaxially with respect to the opening in the housing part and coaxially with respect to the receiving chamber is fixed to the stator metal sheet. As a result, the temperature sensor, which is inserted from the outside through the opening in the housing part, is guided into the receiving chamber by means of the insertion funnel. Incorrect installation of the temperature sensor is thus precluded.

BRIEF DESCRIPTION OF THE DRAWINGS

The invention allows numerous embodiments. For further explanation of the basic principle of the invention, one of the embodiments is illustrated in the drawings and described below. In the figures.

DETAILED DESCRIPTION OF THE INVENTION

Figure 1:
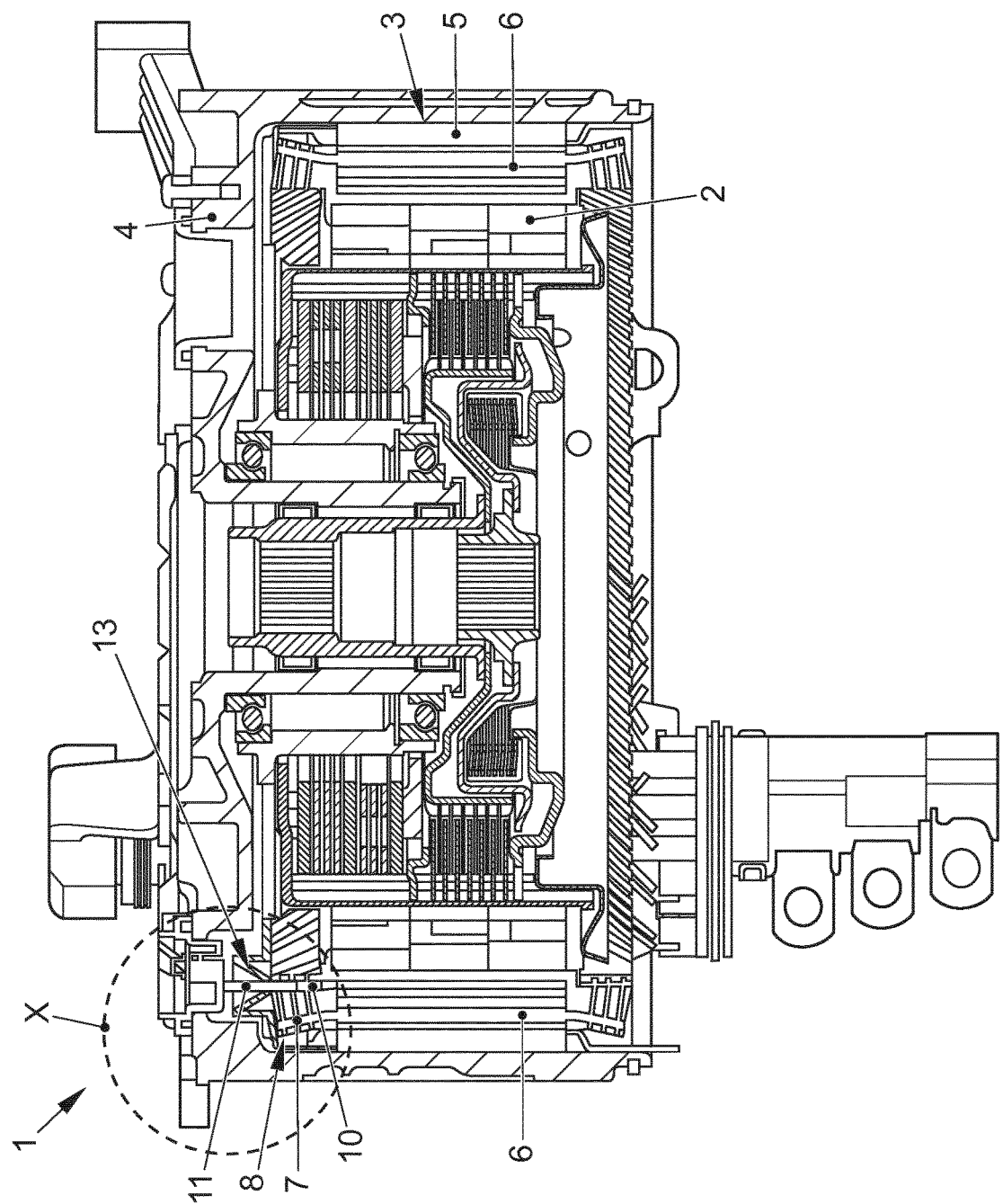
FIG. 1 shows an electric motor according to the invention in a sectional illustration.

FIG. 1 shows an electric motor 1 according to the invention, designed as a drive motor for a motor vehicle, in a sectional illustration. The electric motor 1 has a rotor 2, a stator 3, and a housing part 4, designed as a cooling unit, that encloses the stator 3.

The stator 3 includes a hollow cylindrical stator metal sheet 5 made up of a laminated core, a distributed winding 6 made up of multiple wires and designed as a wave winding, with a winding head 7 that protrudes axially from the stator metal sheet 5 and an insulating washer 8. The distributed winding 6 is situated in radially inwardly extending grooves in the stator metal sheet 5.

Figure 2:
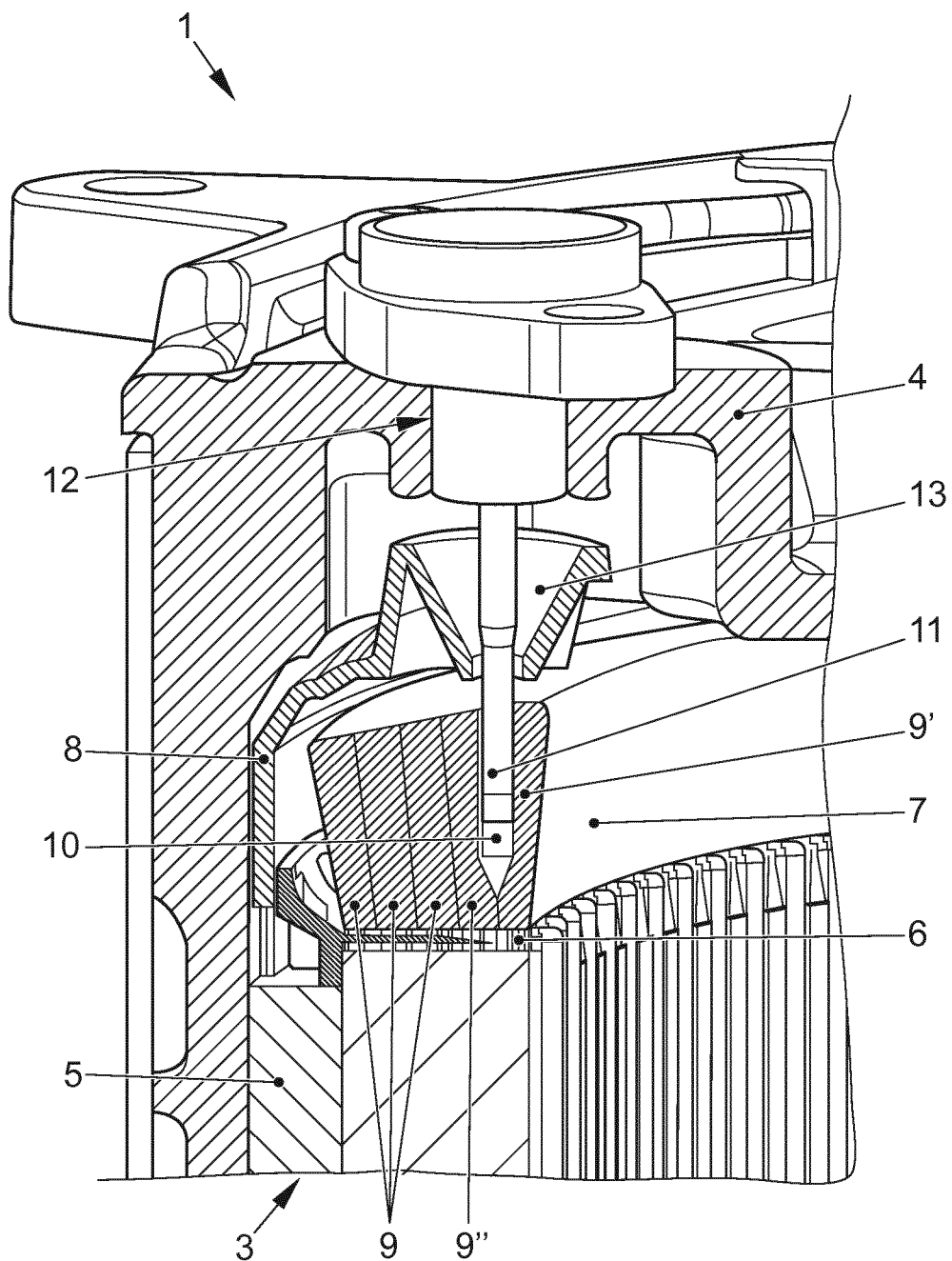
FIG. 2 shows the detail X from FIG. 1 in an enlarged view.

It is apparent in FIG. 2, which shows the detail X from FIG. 1 in an enlarged illustration, that the distributed winding 6 designed as a wave winding and the winding head 7 are made up of multiple circumferential ring-shaped coil layers 9, 9', 9" arranged one above the other in a layered manner. In the illustrated exemplary embodiment, a total of five coil layers 9, 9', 9" form the distributed winding 6. The coil layers 9, 9', 9" in turn are made up of wound wires, in particular made of copper, and in each case form a copper mat.

An axially extending receiving chamber 10 for a temperature sensor 11 for detecting a temperature of the winding 6 is provided between the radially inner first coil layer 9' and the adjacent second coil layer 9" that encloses it. The temperature sensor 11 passes through an opening 12 in the housing part 4 and an insertion funnel 13 situated on the insulating washer 8, and is inserted into the receiving chamber 10 in the winding head 7, which is embedded between the two coil layers 9', 9".

The method according to the invention for manufacturing the electric motor 1 depicted in FIGS. 1 and 2 is briefly described below, with reference to FIGS. 3 through 10.

Figure 3:
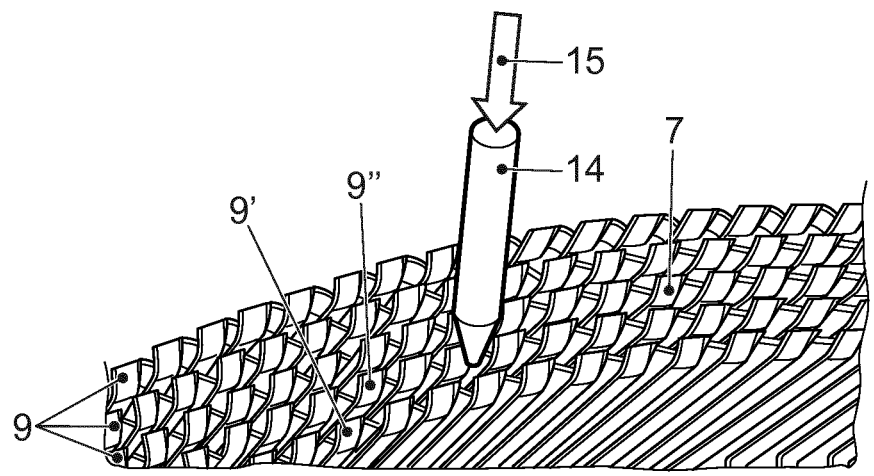
FIG. 3 shows a schematic illustration of the winding head during a first method step of the method according to the invention.
Figure 4:
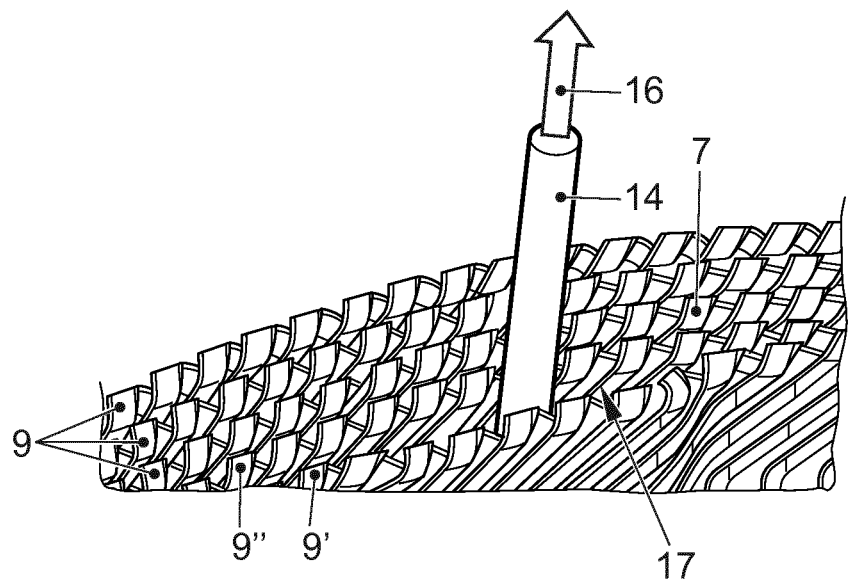
FIG. 4 shows a schematic illustration of the winding head during the second method step.
Figure 5:
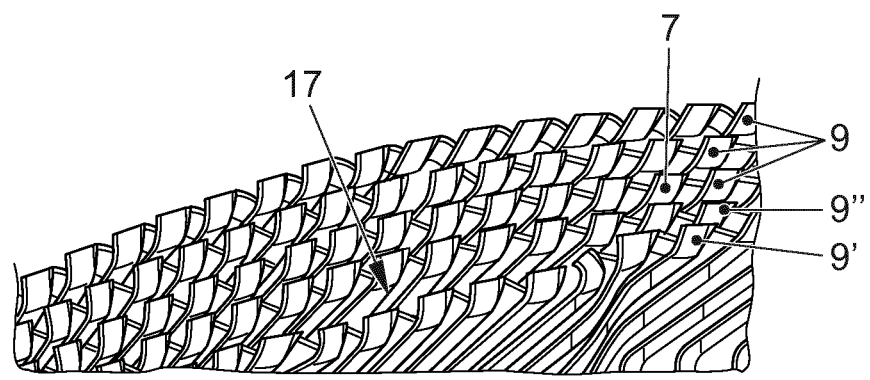
FIG. 5 shows a schematic illustration of a gap-shaped recess in the winding head after conclusion of the second method step.

A tool mandrel 14 as illustrated in FIG. 3 is initially introduced in the axial direction between the radially inner first coil layer 9' and the adjacent second coil layer 9" of the winding head 7 until it is in the position, illustrated in FIG. 4, between the two coil layers 9', 9". The introduction of the tool mandrel 14 is illustrated by a directional arrow 15 in FIG. 3. The tool mandrel 14 is subsequently removed from the winding head 7 (see directional arrow 16 in FIG. 4). Due to the rigidity of the coil layers made up of copper wire, and the resulting limited bending radius, introducing the tool mandrel 14 results in bending of the coil layers 9', 9", at least in sections, so that a gap-shaped recess 17, illustrated in FIGS. 4 and 5, is formed between the coil layers.

Figure 6:
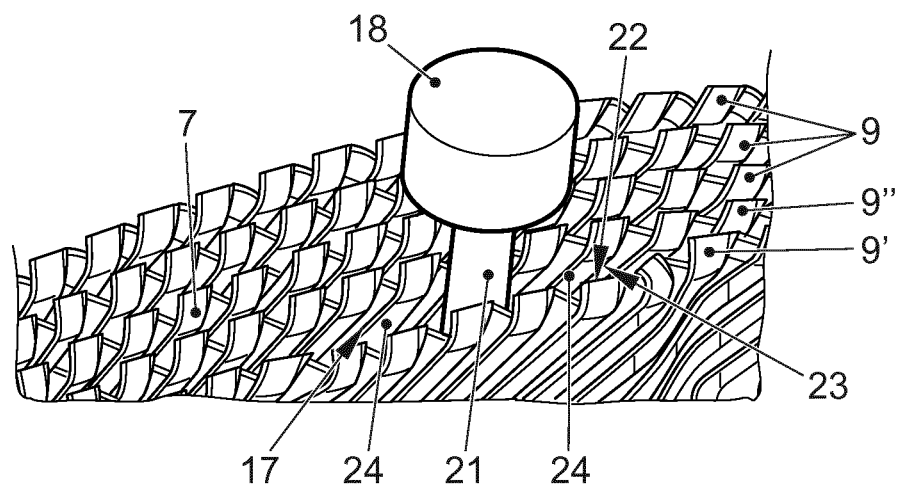
FIG. 6 shows a schematic illustration of the winding head during the third method step.
Figure 7:
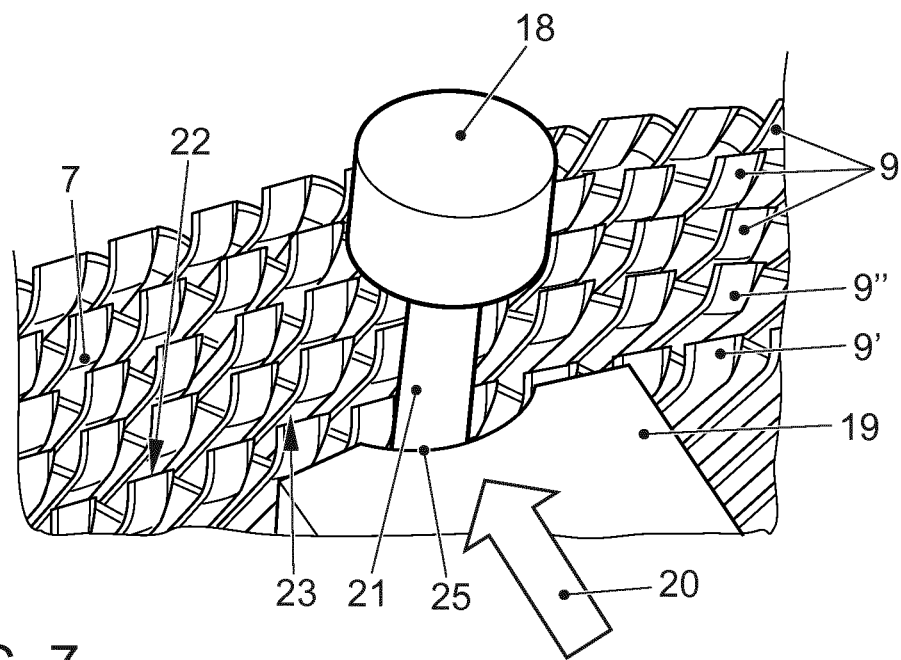
FIG. 7 shows a schematic illustration of the winding head during the fourth method step.
Figure 8:
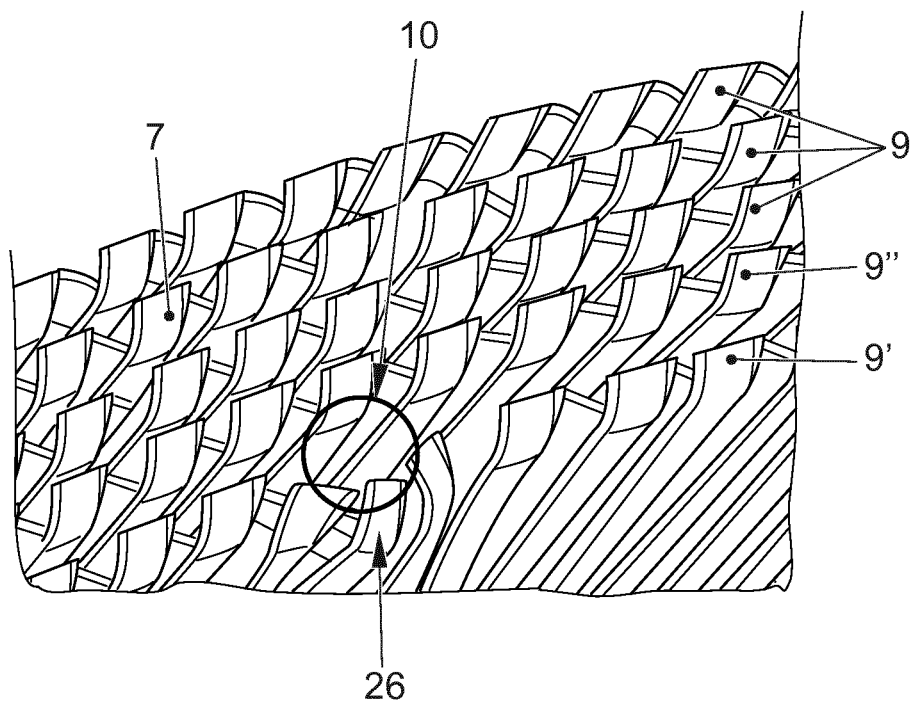
FIG. 8 shows a schematic illustration of a receiving chamber for the temperature sensor in the winding head after conclusion of the fourth method step.

Next, as illustrated in FIG. 6, a placeholder 18 for the temperature sensor 11 is initially situated in the gap-shaped recess 17 between the two coil layers 9', 9". A cross-sectional area of the placeholder 18 corresponds approximately to the cross-sectional area of the temperature sensor. The first coil layer 9' is then pressed against an outer circumferential surface 21 of the placeholder 18 and against the second coil layer 9", i.e., pushed in the direction of the second coil layer 9" (see directional arrow 20), by means of a forming die 19 that acts on the first coil layer in the radial direction. The first coil layer 9' is hereby plastically deformed in such a way that a space 24 present between the lateral surfaces 22, 23 of the two coil layers 9', 9" and the circumferential surface 21 of the placeholder 18 (see FIG. 6) is reduced, and at the same time a contact surface between the lateral surface 22 of the first coil layer 9' and the circumferential surface 20 [sic; 21] of the placeholder 18 is enlarged. The receiving chamber 10 for the temperature sensor 11 is then formed by subsequently removing the placeholder 18 (see FIG. 8).

The forming die 19 that acts on the first coil layer 9' in the radial direction has a concave recess 25 that extends in the axial direction. A section 26 of the first coil layer 9' that encloses the placeholder 18, at least in sections, or rests against same is formed by this concave recess 25 (see FIG. 8). Thus, after the plastic deformation this section 26 of the first coil layer 9' has the negative shape of the concave recess 25 of the forming die 19.

For subsequent impregnation of the winding head in an impregnation bath, another, second placeholder (not illustrated) is inserted into the receiving chamber 10, thus preventing flooding of the receiving chamber 10 with impregnation material. After the impregnation, the second placeholder is then removed from the receiving chamber 10. It would also be conceivable for the placeholder 18, which has been situated between the two coil layers 9, 9" during the plastic deformation of the first coil layer 9', to be removed from the receiving chamber 10 only after the impregnation. Depending on the location of the placeholder 18 or the second placeholder (not illustrated) in the impregnation bath, it may be necessary to secure them from falling out. This may take place by means of an undercut, or by a form-fit or force-fit connection to one of the parts of the stator 3 adjacent to the winding head 7.

Figure 9:
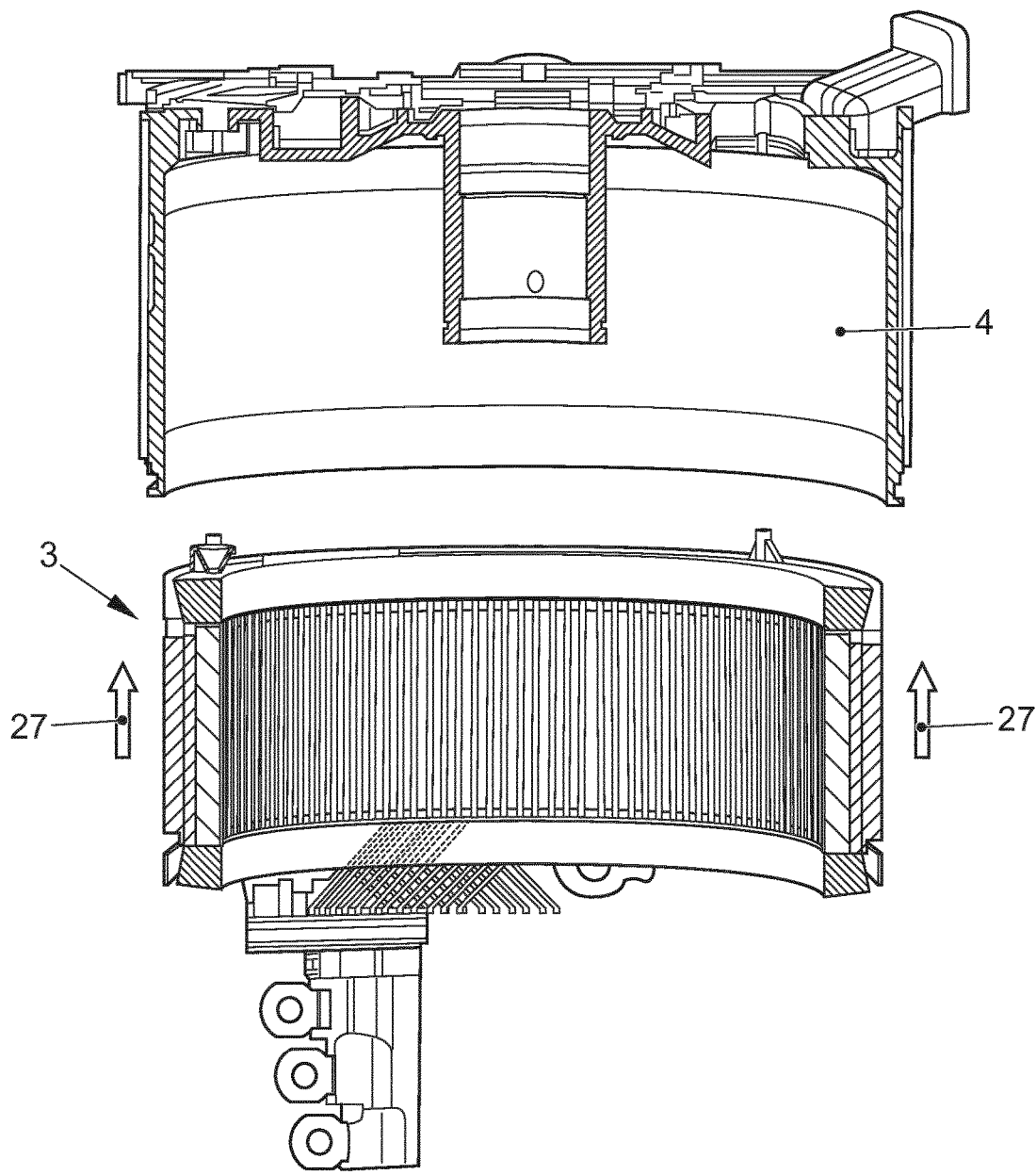
FIG. 9 shows a schematic illustration of the stator and the housing part during the joining operation.
Figure 10:
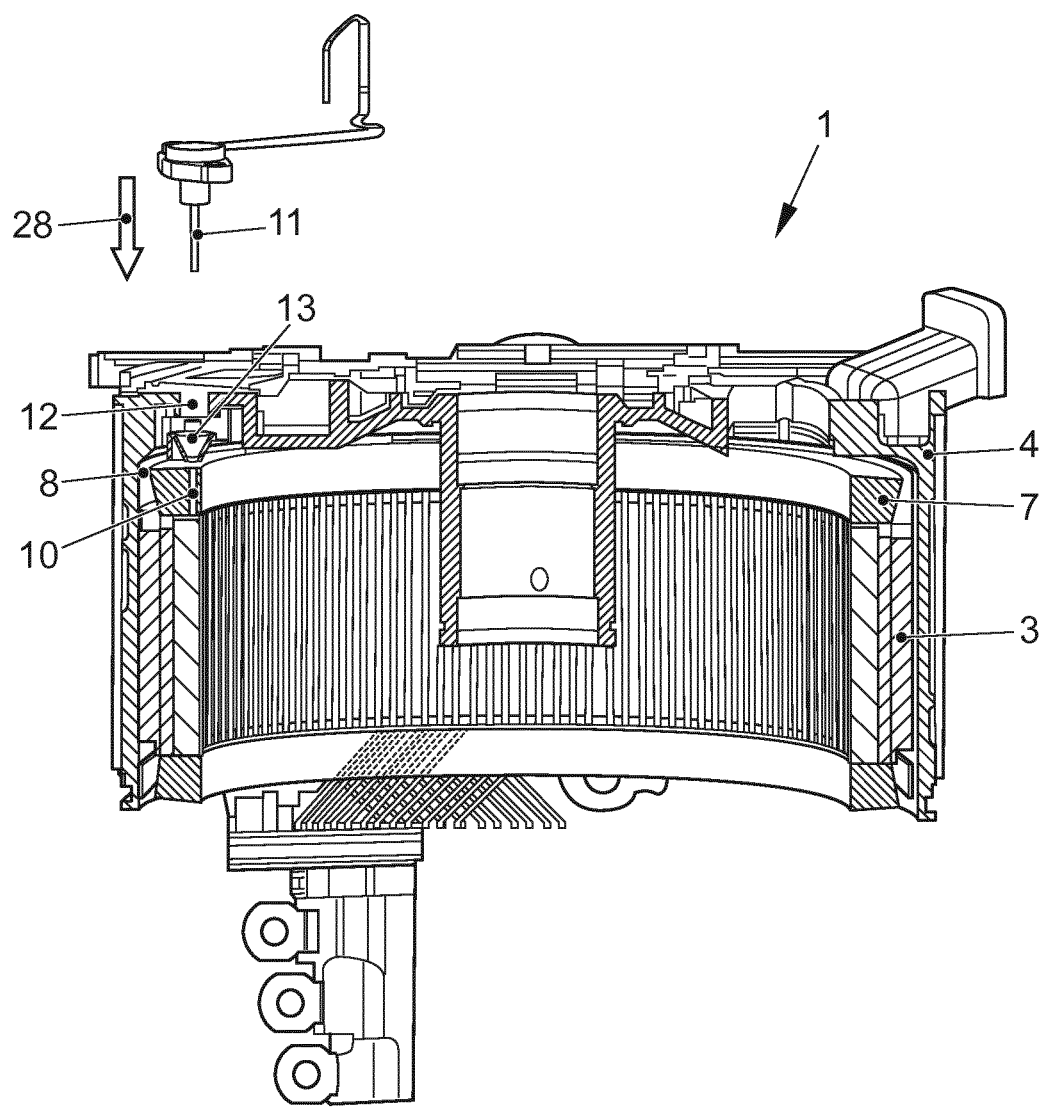
FIG. 10 shows a schematic illustration of the electric motor during the operation of inserting the temperature sensor into the receiving chamber in the winding head.
Figure 11:
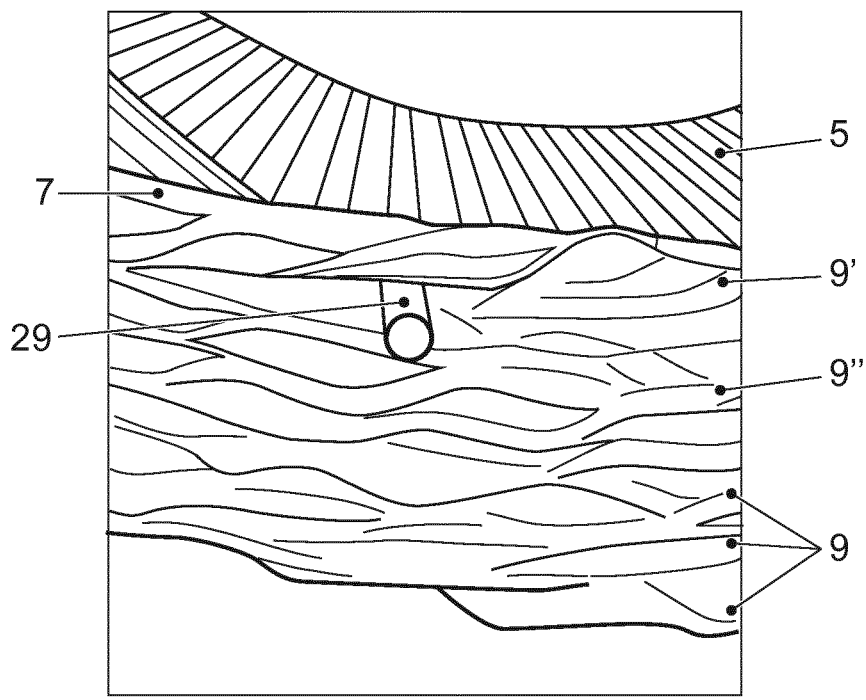
FIG. 11 shows a schematic illustration of the winding head during a first method step of an alternative method variant.
Figure 12:
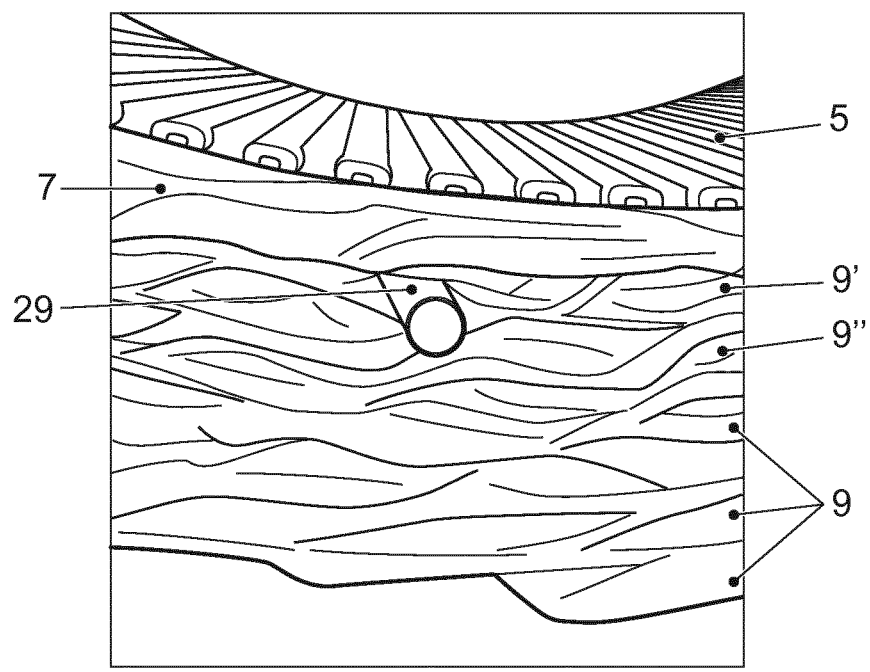
FIG. 12 shows a schematic illustration of the winding head during a second method step of the alternative method variant.
Figure 13:
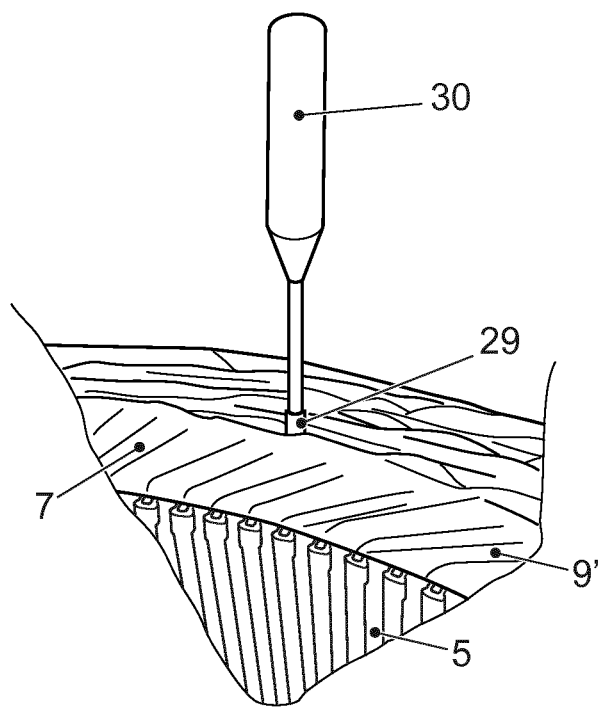
FIG. 13 shows a schematic illustration of the winding head during a third method step of the alternative method variant.
Figure 14:
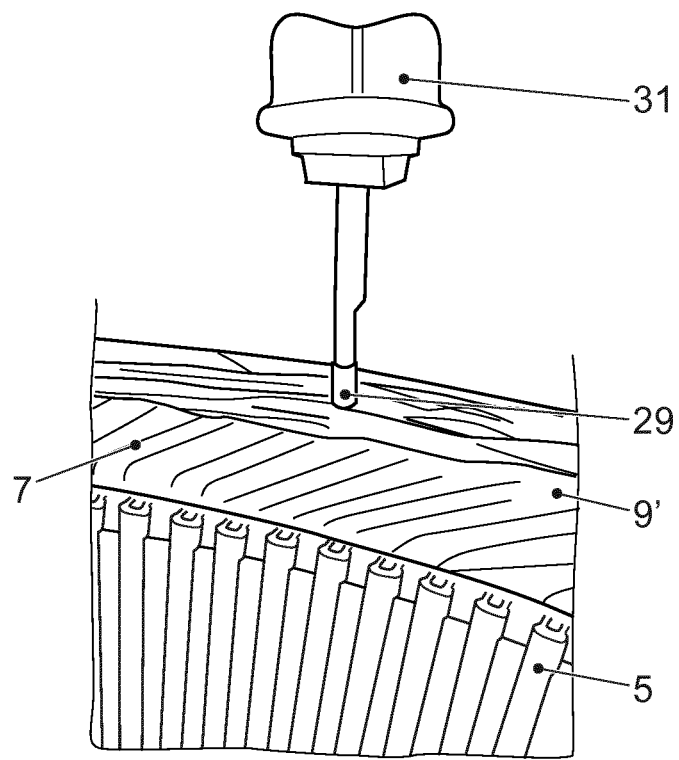
FIG. 14 shows a schematic illustration of the winding head during a fourth method step of the alternative method variant.

The stator 3 together with the rotor 2 is subsequently inserted into the housing part 4 designed as a cooling unit, as illustrated in FIG. 9. After the joining process, indicated by two directional arrows 27 in FIG. 9, the temperature sensor 11 is then inserted into the receiving chamber 10 in the winding head 7 through the opening 12 in the housing part 4. The temperature sensor is guided into the receiving chamber 10 through the insertion funnel 13, situated coaxially or congruently with respect to the opening 12 and coaxially with respect to the receiving chamber 10, on the insulating washer 8. The insertion of the temperature sensor 11 into the electric motor 1 is indicated by a directional arrow 28 in FIG. 10.

FIGS. 11 through 14 show a modified method variant according to which a tube 29, in particular made of Capton or heat shrink tubing, is adhesively bonded to one of the coil layers 9', 9" between the radially inner first coil layer 9' and the adjacent second coil layer 9", before the individual coil layers 9 are inserted. Alternatively, the tube 29 may be inserted between two coil layers 9', 9" in the insertion process. The tube 29 is compressed during the insertion process. After insertion into the coil layers 9, 9', 9" is complete, a rigid placeholder 30 is pressed into the tube 29, the tube 29 acting as an insertion aid. For the impregnation process, the rigid placeholder 30 is then replaced by a placeholder 31 made of PTFE. It is also conceivable for the rigid placeholder 30 to be omitted, and for the PTFE placeholder 31 to be similarly pressed into the tube 29, the placeholder remaining in the tube 29 for the impregnation process and not being removed until afterwards.

LIST OF REFERENCE NUMERALS

| | |
|---|---|
| 1 | electric motor |
| 2 | rotor |
| 3 | stator |
| 4 | housing part |
| 5 | stator metal sheet |
| 6 | winding |
| 7 | winding head |
| 8 | insulating washer |
| 9 | coil layer |
| 9' | first coil layer |
| 9" | second coil layer |
| 10 | receiving chamber |
| 11 | temperature sensor |
| 12 | opening |
| 13 | insertion funnel |
| 14 | tool mandrel |
| 15 | directional arrow |
| 16 | directional arrow |
| 17 | gap-shaped recess |
| 18 | placeholder |
| 19 | forming die |
| 20 | directional arrow |
| 21 | circumferential surface |
| 22 | lateral surface |
| 23 | lateral surface |
| 24 | space |
| 25 | concave recess |
| 26 | section |
| 27 | directional arrow |
| 28 | directional arrow |
| 29 | tube |
| 30 | placeholder |
| 31 | placeholder |

The invention claimed is:

1. A method for manufacturing an electric motor comprising a rotor and a stator, the stator thereof having a hollow cylindrical stator metal sheet and a distributed winding made up of multiple circumferential coil layers arranged one above the other in a layered manner, the method comprising:
    inserting a placeholder for a temperature sensor for detecting a temperature of the winding in the axial direction between a first coil layer and an adjacent second coil layer of a winding head of the winding in such a way that the placeholder is situated in a gap-shaped recess extending into an interior of the winding head between the first coil layer and the second coil layer,
    pressing the first coil layer onto a circumferential surface of the placeholder and onto the second coil layer, and plastically deforming the first coil layer such that a space between the lateral surfaces of the two coil layers and the circumferential surface of the placeholder is reduced, and such that a contact surface between the lateral surface of the first coil layer and the circumferential surface of the placeholder is enlarged,
    wherein, by subsequent removal of the placeholder, a receiving chamber is formed in the winding head, the receiving chamber extending in the axial direction between the first coil layer and the adjacent second coil layer into an interior of the winding head, and
    inserting a temperature sensor into the receiving chamber, such that the temperature sensor is thereupon circumferentially enclosed by the first coil layer and the adjacent second coil layer such that an outer lateral surface of the temperature sensor is in contact with the first coil layer and adjacent second coil layer within the interior of the winding head.

2. The method according to claim 1, wherein the placeholder is introduced between a radially inner first coil layer or a radially outer first coil layer and an adjacent second coil layer of the winding head.

3. The method according to claim 1, wherein the pressing of the first coil layer against the placeholder and the second coil layer takes place using a forming die that acts on the first coil layer in the radial direction.

4. The method according to claim 1, wherein a forming die having a concave recess that extends in the axial direction is used, a section of the first coil layer resting against the placeholder being formed by the concave recess of the forming die.

5. The method according to claim 1, wherein the gap-shaped recess between the two coil layers-is created by axially inserting a tool mandrel or the placeholder between the two coil layers.

6. The method according to claim 1, wherein the winding head is impregnated with an impregnation material prior to removal of the placeholder, or wherein placeholder is removed prior to the impregnation, and the receiving chamber for the temperature sensor is closed by off by another, second placeholder which is removed from the receiving chamber after the impregnation.

7. The method according to claim 1, wherein the stator is inserted into a housing part after the impregnation and the removal of the particular placeholder from the receiving chamber, and the temperature sensor is subsequently inserted into the receiving chamber in the winding head through an opening in the housing part.

8. The method according to claim 1, wherein, before the stator is inserted into a housing part, an insulating washer with an insertion funnel is situated on the stator metal sheet in such a way that, after insertion, the insertion funnel is situated coaxially with respect to an opening in the housing part and coaxially with respect to the receiving chamber in the winding head of the stator, and during insertion into the opening in the housing part, the temperature sensor is guided by the insertion funnel into the receiving chamber in the winding head.

9. An electric motor comprising:
a rotor,
a stator, the stator having a stator metal sheet, and a distributed winding made up of multiple circumferential ring-shaped coil layers arranged one above the other in a layered manner and having a winding head, and
a temperature sensor for detecting a temperature of the winding configured to be inserted through an opening in a housing part that encloses the stator, at least in sections, and into a receiving chamber arranged between two coil layers that extends into an interior of the winding head,
wherein the temperature sensor is circumferentially enclosed in contact with the two coil layers within the interior of the winding head.

10. The electric motor according to claim 9, wherein an insulating washer having an insertion funnel that is situated coaxially with respect to the opening in the housing part and coaxially with respect to the receiving chamber is fixed to the stator metal sheet.

* * * * *